United States Patent
Dillard et al.

(10) Patent No.: US 11,442,164 B2
(45) Date of Patent: Sep. 13, 2022

(54) SYSTEMS AND METHODS FOR DETERMINING CONVECTIVE CELL GROWTH FROM WEATHER RADAR REFLECTIVITY DATA

(71) Applicant: HONEYWELL INTERNATIONAL INC., Morris Plains, NJ (US)

(72) Inventors: Michael Dillard, St. Louis Park, MN (US); Santosh Mathan, Seattle, WA (US); Paul Christianson, Seattle, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 502 days.

(21) Appl. No.: 16/434,863

(22) Filed: Jun. 7, 2019

(65) Prior Publication Data

US 2020/0386884 A1 Dec. 10, 2020

(51) Int. Cl.
*G01S 13/95* (2006.01)
*G01S 7/06* (2006.01)
(Continued)

(52) U.S. Cl.
CPC .............. *G01S 13/953* (2013.01); *G01S 7/06* (2013.01); *G01S 7/411* (2013.01); *G01S 7/04* (2013.01);
(Continued)

(58) Field of Classification Search
CPC .......... G01S 13/953; G01S 13/95; G01S 7/04; G01S 7/411; G01S 13/723; G01S 17/95;
(Continued)

(56) References Cited

U.S. PATENT DOCUMENTS 6,266,063 B1 7/2001 Baron et al.
6,424,288 B1 * 7/2002 Woodell ................ G01S 7/2925
342/26 R
(Continued)

FOREIGN PATENT DOCUMENTS

EP 2461177 A1 * 6/2012 ........... G01S 13/953
EP 3018492 A1 5/2016
EP 3330738 A1 6/2018

OTHER PUBLICATIONS

Rockwell Collins MultiScan ThreatTrack Quick Reference Guide, 2014, downloaded on Mar. 14, 2019.
(Continued)

*Primary Examiner* — Olumide Ajibade Akonai
(74) *Attorney, Agent, or Firm* — Lorenz & Kopf, LLP

(57) ABSTRACT

A method for determining convective cell growth from weather radar reflectivity data includes receiving first weather reflectivity values and receiving second weather reflectivity values at a point in time subsequent to receiving the first weather reflectivity values, storing the first and second weather reflectivity values in cells of a three-dimensional buffer, for each of the first and second weather reflectivity values, calculating a vertically-integrated reflectivity (VIR) value for a column of cells in the three-dimensional buffer, the column of cells being associated with a latitude/longitude position, and comparing the VIR value for the second weather reflectivity values against the VIR for the first weather reflectivity values to determine a difference in the VIR values. Furthermore, the method includes displaying a cell growth hazard indication at a weather display in an area of the weather display that corresponds to the latitude/longitude position.

10 Claims, 6 Drawing Sheets

(51) Int. Cl.
*G01S 7/41* (2006.01)
*G01W 1/10* (2006.01)
*G01S 7/04* (2006.01)
*G01W 1/00* (2006.01)
*G08G 5/00* (2006.01)

(52) U.S. Cl.
CPC ........ *G01W 1/10* (2013.01); *G01W 2001/003* (2013.01); *G08G 5/0021* (2013.01)

(58) Field of Classification Search
CPC ...... G01S 7/062; G01S 13/933; G01S 13/955; G01S 7/06; G01S 7/22; G08G 5/0091; G08G 5/0021; G01W 1/00; G01W 1/10; G01W 2001/003; G01W 1/02; Y02A 90/10
USPC .................................... 342/26 B, 26 R, 26 C
See application file for complete search history.

(56) References Cited

U.S. PATENT DOCUMENTS

| | | | |
|---|---|---|---|
| 6,879,280 B1 | 4/2005 | Bull et al. | |
| 6,882,302 B1* | 4/2005 | Woodell | G01S 13/953 342/26 R |
| 7,109,913 B1* | 9/2006 | Paramore | G01C 23/00 342/26 B |
| 7,242,343 B1* | 7/2007 | Woodell | G01S 7/41 342/26 B |
| 7,486,220 B1 | 2/2009 | Kronfeld et al. | |
| 7,492,305 B1 | 2/2009 | Woodell et al. | |
| 7,515,087 B1 | 4/2009 | Woodell et al. | |
| 7,656,343 B1 | 2/2010 | Hagen et al. | |
| 8,068,050 B2 | 11/2011 | Christianson | |
| 8,159,369 B1 | 4/2012 | Koenigs et al. | |
| 8,228,227 B2 | 7/2012 | Bunch et al. | |
| 8,319,679 B2 | 11/2012 | Christianson | |
| 9,188,700 B2* | 11/2015 | Bunch | G01W 1/00 |
| 9,411,044 B1 | 8/2016 | Sperling et al. | |
| 9,507,022 B1 | 11/2016 | Breiholz et al. | |
| 9,612,328 B1* | 4/2017 | Breiholz | G01S 13/953 |
| 9,613,269 B2 | 4/2017 | Kilty et al. | |
| 9,710,218 B2* | 7/2017 | Khatwa | G01S 7/22 |
| 9,978,168 B1 | 5/2018 | Finley et al. | |
| 10,139,486 B2 | 11/2018 | Kim et al. | |
| 10,288,768 B2* | 5/2019 | Bai | G01S 13/95 |
| 10,302,815 B1* | 5/2019 | Kronfeld | G01W 1/10 |
| 10,408,972 B1* | 9/2019 | Baker | G01W 1/06 |
| 10,605,912 B1* | 3/2020 | Godfrey | G01S 13/953 |
| 11,203,438 B1* | 12/2021 | Sishtla | B64D 15/12 |
| 2004/0239550 A1* | 12/2004 | Daly, Jr. | G01S 13/723 342/26 B |
| 2006/0145912 A1* | 7/2006 | Makkapati | G01S 7/003 342/26 R |
| 2011/0148692 A1 | 6/2011 | Christianson | |
| 2012/0154209 A1 | 6/2012 | Christianson | |
| 2013/0234884 A1 | 9/2013 | Bunch et al. | |
| 2016/0011334 A1* | 1/2016 | Khatwa | G01W 1/00 702/3 |
| 2016/0011741 A1* | 1/2016 | Khatwa | G08G 5/0052 715/765 |
| 2016/0131758 A1* | 5/2016 | Christianson | G01S 7/062 342/26 R |
| 2016/0154101 A1* | 6/2016 | Kim | G01S 13/953 342/26 R |
| 2016/0274271 A1 | 9/2016 | Lukas et al. | |
| 2017/0249852 A1* | 8/2017 | Haskins | G01S 19/15 |
| 2018/0149745 A1* | 5/2018 | Christianson | G01S 7/003 |

OTHER PUBLICATIONS

Collins Aerospace, "WXR-2100 MultiScan ThreatTrack Weather Radar," downloaded on Mar. 14, 2019.

* cited by examiner

SYSTEMS AND METHODS FOR DETERMINING CONVECTIVE CELL GROWTH FROM WEATHER RADAR REFLECTIVITY DATA

TECHNICAL FIELD

The present disclosure generally relates to weather detection using radar. More particularly, the present disclosure relates to systems and methods for determining convective cell growth from weather radar reflectivity data.

BACKGROUND

Convective weather occurs when humid air is heated in an unstable atmosphere. As the air is heated, it rises. As it rises, it expands and cools, causing some of its moisture to condense as clouds. This condensation releases more heat into the air, causing it to rise further. In the unstable atmosphere, which has an adiabatic lapse rate exceeding standard, the air can remain warmer than its surrounding atmosphere for many thousands of feet vertically, causing cloud growth to propel upward at great rates of speed to a height of 40,000-50,000 feet or more. The initial heating of the air predominantly occurs when the sun heats the Earth, and the Earth radiates heat to the air immediately above it. Due to variances in heating, the Earth releases more heat radiatively at some locations more so than others, and thus an area of convective weather is rarely uniform in nature, but rather includes a plurality of convective "cells" of various shapes, sizes, and intensities. Moreover, these cells can grow at different rates in terms of both vertical and horizontal size.

While the rate of convective cell growth may be of general interest to the public at large in terms of weather awareness, it is of particular interest to aviators. For example, the rapid vertical growth of a convective cell is indicative of strong updrafts in the atmosphere, which at best would cause extreme turbulence to be encountered by an aircraft and at worst could be structurally catastrophic to the aircraft. Rapid horizontal growth could cause an inadvertent encounter with the cell when attempting to circumnavigate the aircraft. Moreover, convective cells are associated with other dangers to aircraft, such as hail, which can cause damage to aircraft windscreens and turbine blades, and lightning, which can cause some localized damage.

In the aforementioned context of aircraft, it is known to use various weather sources to obtain information regarding the location, size, and intensity of convective weather. One such source is the periodic reports disseminated by various weather services, such as the National Weather Service in the United States. Another source is a weather data-uplink, wherein data obtained from weather radar on the ground is collected and uplinked to an aircraft for display on a flight deck display of the aircraft. Likewise, air traffic controllers often are provided with similar weather radar data, which can be relayed to the flight crew of the aircraft verbally. Yet, at least in the context of commercial aircraft, the primary and most up-to-date source of data regarding convective weather is an on-board weather radar system. This weather radar system, usually located on a wing or in a nose-cone of the aircraft, emits radio waves forward of the aircraft within a defined horizontal angular range and a defined vertical angular range. These radio waves bounce off precipitation in the convective cell (e.g., rain, hail, snow) and return to the system in the form of a reflected signal. The reflected signal from all ranges of operation of the radar system are referred to as reflectivity data, and the reflectivity data is provided to the flight crew on a flight deck display to indicate the location and intensity of the precipitation in the convective cell.

While certainly useful in operating the aircraft for purposes of weather avoidance, reflectivity data obtained from the on-board weather radar system has certain limitations. For example, while reflectivity data can be obtained from a range of altitudes for the geographic area in front of the aircraft, the flight deck display may be limited graphically to showing the reflectivity of only a single altitude at one time. As such, the vertical extent and development in terms of intensity at varying altitudes of a convective cell is often not immediately apparent to the flight crew. Moreover, reflectivity data represents a snapshot in time, that is, of the time that the scan occurs. As such, the flight deck display may lack any trend data in terms of cell growth, either in the horizontal or vertical directions. Thus, while the flight crew is provided with information regarding the convective cell from perhaps 10 to 50 miles away as the aircraft approaches the cell, the present state of the art is that the flight crew is left with some uncertainty as to what the cell will look like later in time once the aircraft reaches the cell.

Underestimation, or lack of knowledge, of the growth of a convective cell has led to several aircraft accidents in the past, when the aircraft encountered severe convective activity in a location or at an altitude where it had not been only minutes previously. Accordingly, it would be desirable to provide systems and methods for determining convective cell growth from weather radar reflectivity data, particularly from an on-board weather radar system. The systems and methods would desirably include or operate in the context of a flight deck display that would allow the flight crew to easily discern convective cells that are growing and that should be given particular attention in terms of weather avoidance. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

Generally disclosed herein are systems and methods for determining convective cell growth from weather radar reflectivity data. In accordance with one exemplary embodiment, a method for determining convective cell growth from weather radar reflectivity data includes, at a processing device, receiving first weather reflectivity values and receiving second weather reflectivity values at a point in time subsequent to receiving the first weather reflectivity values, storing the first and second weather reflectivity values in cells of a three-dimensional buffer, and, for each of the first and second weather reflectivity values, calculating a vertically-integrated reflectivity (VIR) value for a column of cells in the three-dimensional buffer, the column of cells being associated with a latitude/longitude position. The method further includes, at the processing device, comparing the VIR value for the second weather reflectivity values against the VIR for the first weather reflectivity values to determine a difference in the VIR values. Still further, the method includes, at a display device coupled to the processing device, and if the difference in the sum of reflectivity values is greater than a threshold value, displaying a cell growth hazard indication at a weather display in an area of the weather display that corresponds to the latitude/longitude position.

In accordance with another exemplary embodiment, a system for determining convective cell growth from weather radar reflectivity data includes a display device coupled to receive display commands configured, in response to the display commands, to display one or more images, and a processing device coupled to the display device and configured to receive first weather reflectivity values and receiving second weather reflectivity values at a point in time subsequent to receiving the first weather reflectivity values, to store the first and second weather reflectivity values in cells of a three-dimensional buffer, and, for each of the first and second weather reflectivity values, to calculate a VIR value for a column of cells in the three-dimensional buffer, the column of cells being associated with a latitude/longitude position. The processing device is further configured to compare the VIR value for the second weather reflectivity values against the VIR for the first weather reflectivity values to determine a difference in the VIR values, and, if the difference in the VIR values is greater than a threshold value, supply display commands to the display device that cause the display device to display a cell growth hazard indication at a weather display in an area of the weather display that corresponds to the latitude/longitude position.

This brief summary is provided to describe select concepts in a simplified form that are further described in the detailed description, in accordance with various embodiments that encompass the concepts described in the brief summary. This brief summary is not intended to identify key or essential features of the subject matter of the present disclosure, with reference to the claims or otherwise, nor is this brief summary intended to be used as an aid in determining the full scope of the disclosed subject matter, which is properly determined with reference to the various embodiments of the present disclosure.

BRIEF DESCRIPTION OF THE DRAWING FIGURES

A more complete understanding of the disclosure may be derived from the accompanying drawing figures, wherein like reference numerals denote like elements, and wherein.

Figure 3:
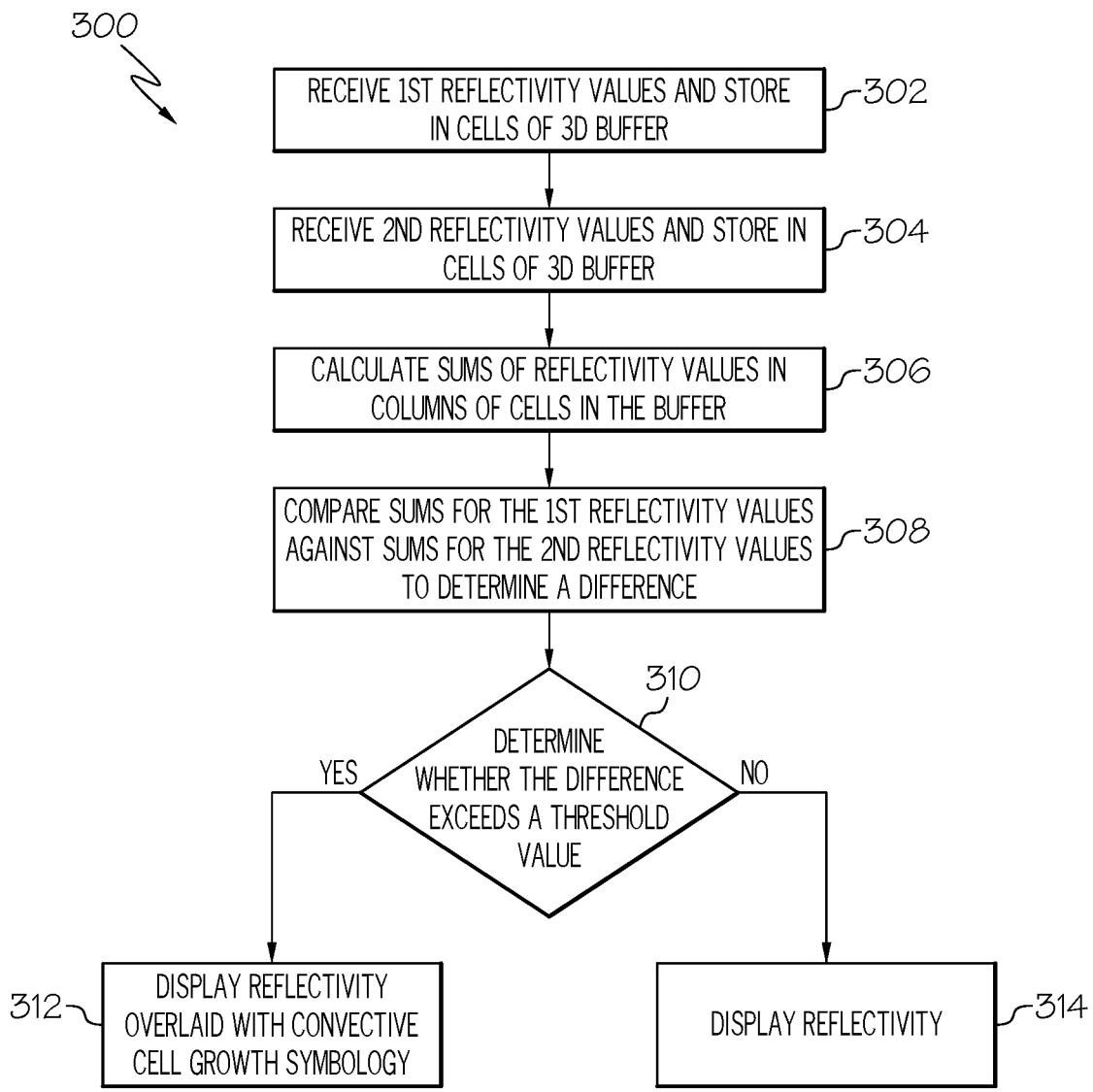
Figure 4:
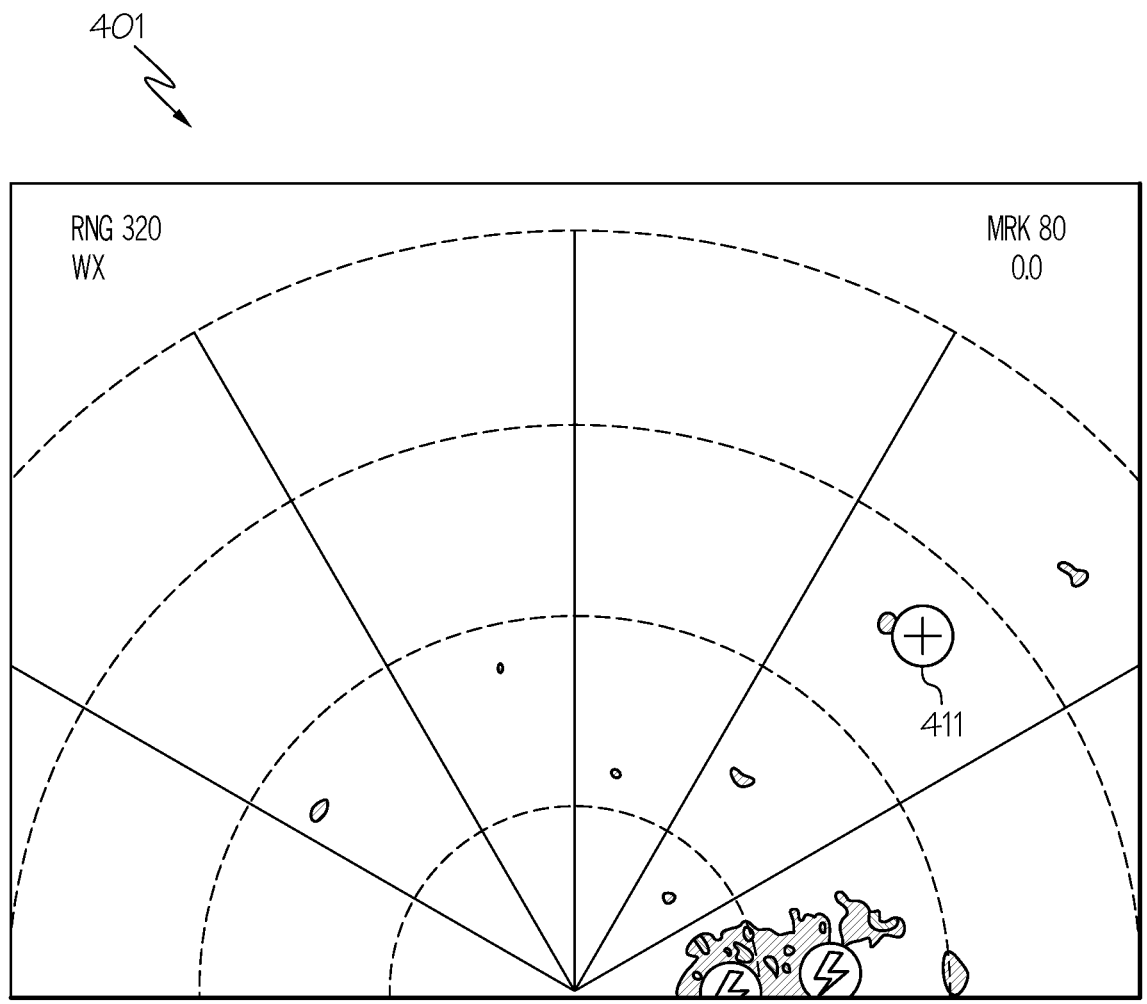
Figure 5:
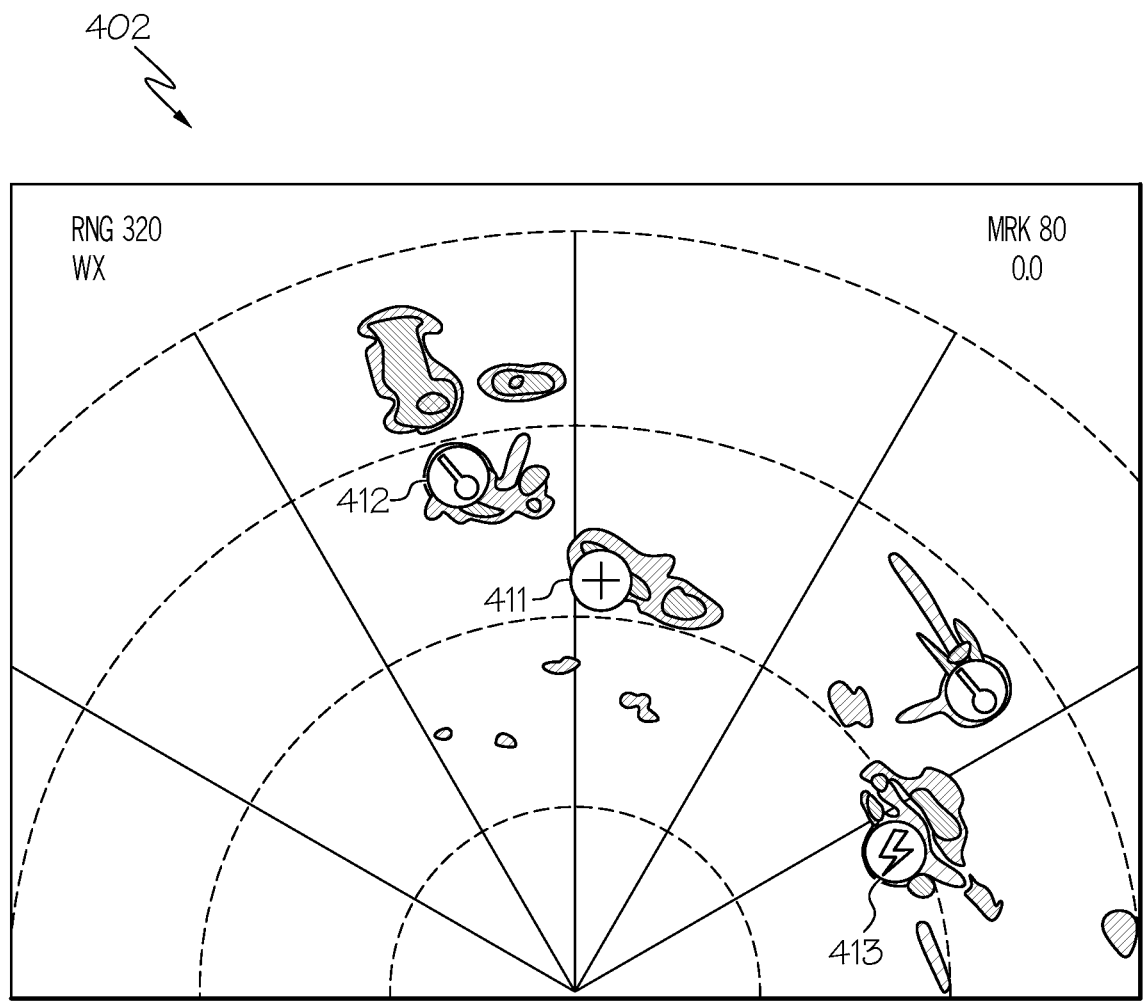
Figure 6:
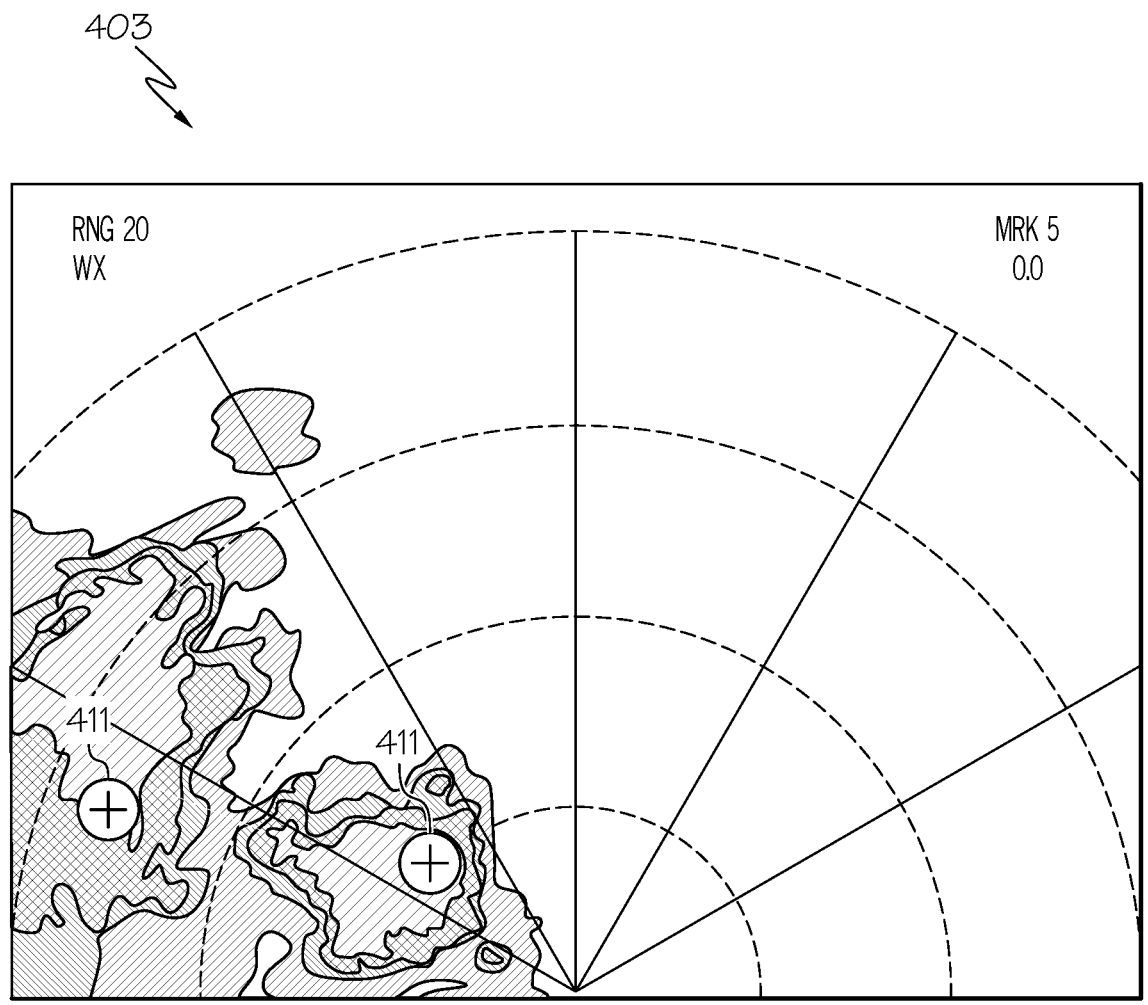

FIG. 3 is a flowchart illustrating a method for determining convective cell growth from weather radar reflectivity data in accordance with exemplary embodiments of the present disclosure; and FIGS. 4-6 are non-limiting examples of graphical flight-deck displays that illustrate weather radar reflectivity data overlaid with cell growth symbology in accordance with exemplary embodiments of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Generally disclosed herein are systems and methods for determining convective cell growth from weather radar reflectivity data, for example in the context of an aircraft operating in flight. The systems and methods operate by obtaining weather radar reflectivity data at various altitudes over a geographic area (for example a distance range in front of the aircraft). The reflectivity data is stored in a three-dimensional ("volumetric") buffer having a plurality of addresses that are indicative of the geographic location and altitude from which the reflectivity data is obtained. Using the data in the volumetric buffer, addresses that are disposed vertically with regard to one another may be summed or otherwise integrated, resulting in a vertically-integrated reflectivity (VIR) value for a particular geographic location. Multiple adjacent VIR values may define a convective cell. The buffer is updated with new data over time, such data being compensated for movement of the aircraft, movement of the cell, and the curvature of the Earth. A comparison can be made between VIR values for a convective cell at a first time versus the VIR values at a second time to determine convective cell growth, if any. If the comparison indicates cell growth at a rate that exceeds a threshold, symbology may be displayed on a weather radar display in the flight deck of the aircraft so indicating. Such symbology may be integrated into a hierarchy of other convective cell symbology, such as lightning, hail, etc.

While the following exemplary embodiments are discussed in terms of an aircraft in flight, it should be appreciated that other embodiments may be employed in other contexts, such as ground-based radar stations, or radar stations on other vehicles such as ocean-faring vessels, rail-travelling locomotives, automobiles, and the like. In particular, embodiments of the disclosure may be implemented wherever a weather radar system and associated processing software/hardware/display can be located.

Figure 1:
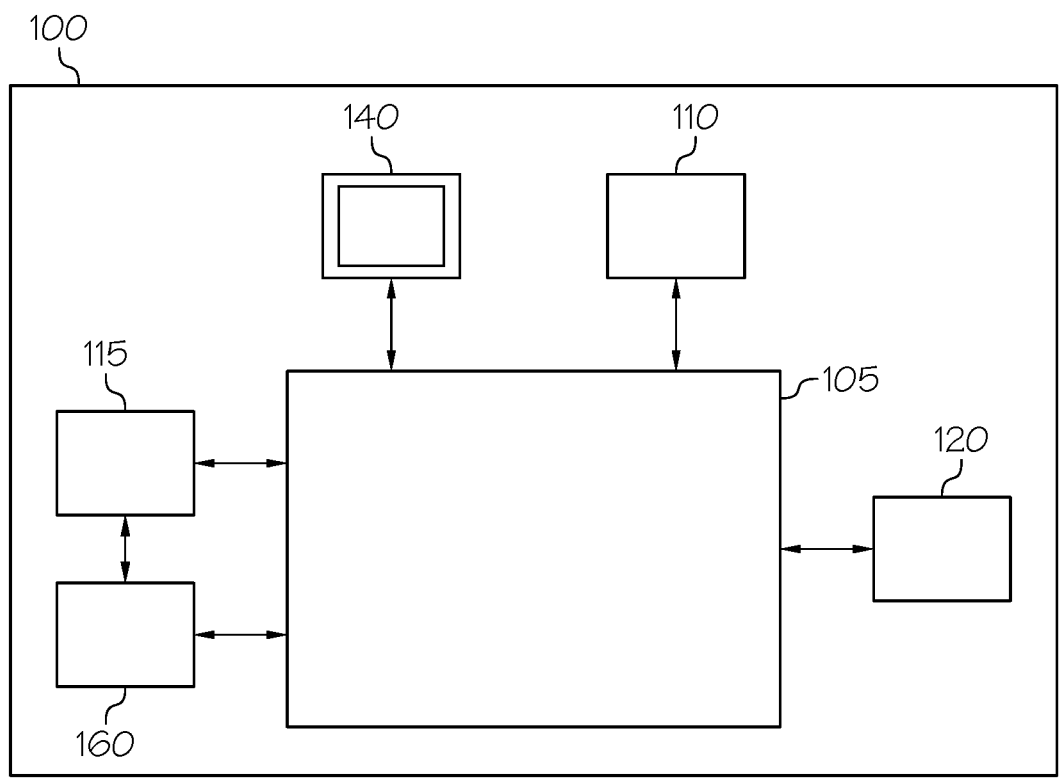
FIG. 1 shows a functional block diagram of an aircraft including various systems, including a weather radar system capable of generating weather radar reflectivity data, in accordance with exemplary embodiments of the present disclosure.

In accordance with one embodiment of the present disclosure, in particular an aviation embodiment, FIG. 1 illustrates an aircraft 100 that includes a processing system 105, a flight management system (FMS) 110, a data buffer system 115, a position-determining system 120, a flight-deck display system 140, and a weather radar system 160. It should be appreciated that aircraft 100 includes many more additional features (systems, databases, etc.) than the illustrated systems 105-160. For purposes of simplicity of illustration and discussion, however, the illustrated aircraft 100 omits these additional features.

Aircraft 100 may be any type of vehicle that is capable of travelling through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft 100 may be "manned" in the conventional sense that the flight crew is present within the aircraft 100, or it may be manned remotely.

Processing system 105 functions to receive and process data from the various systems of the aircraft 100 (e.g., systems 110-160) during operation of the aircraft 100. The processing system 105 generally represents hardware, software, and/or firmware components configured to facilitate communications and/or interaction between the elements of the aircraft 100 and perform additional tasks and/or functions to support operation of the aircraft 100. Depending on the embodiment, the processing system 105 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof. The processing system 105 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 105 includes processing logic that may be configured to carry out the functions, techniques, and processing tasks associated with the operation of the aircraft 100, and in particular probabilistically determining the intended flight route of another aircraft. As such, processing system 105 may be embodied with data processing functionalities utilizing any custom made or commercially available processor, a central processing unit (CPU), a graphics processing unit (GPU), an auxiliary processor among several processors, a semiconductor-based microprocessor (in the form of a microchip or chip set), a macroprocessor, any combination thereof, or generally any device for executing electronic instructions. Moreover, processing system 105 may be embodied with data storage functionalities utilizing volatile and/or nonvolatile storage such as read-only memory (ROM), random-access memory (RAM), and keep-alive memory (KAM), for example, and may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

Flight management system 110 provides the primary navigation, flight planning, and route determination and en route guidance for the aircraft 100. Flight management system 110 may provide navigation data associated with the aircraft's current position and flight direction (e.g., heading, course, track, etc.) to processing system 105. The navigation data provided to processing system 105 may also include information about the aircraft's airspeed, ground speed, altitude (e.g., relative to sea level), pitch, and other important flight information if such information is desired. In any event, for this exemplary embodiment, flight management system 110 may include any suitable position and direction determination devices that are capable of providing processing system 105 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.). Flight management system 110 and processing system 105 cooperate to guide and control aircraft 100 during all phases of operation, as well as to provide other systems of aircraft 100 with flight data generated or derived from flight management system 110.

Data buffer system 115 functions to store weather reflectivity data from the weather radar system 160 in a plurality of three-dimensional addresses representative of geographical area and altitude. As such, data buffer system may be embodied with data storage functionalities utilizing volatile and/or nonvolatile storage such as read-only memory (ROM), random-access memory (RAM), and keep-alive memory (KAM), for example, and may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data. Data buffer system 115 may also be functional to store a time-stamp component along with the reflectivity data such that multiple reflectivity sets may be stored over time.

Position-determining system 120 is operably connected with the processing system 105 and cooperates with the operation of flight management system 110. Position-determining system 120 is configured to obtain one or more navigational parameters associated with the operation of the aircraft 100. The position-determining system 120 may be realized as one or more of a global positioning system (GPS), inertial reference system (IRS), or a radio-based navigation system (e.g., VHF omni-directional radio range (VOR) or long-range aid to navigation (LORAN)), and it may include one or more navigational radios or other sensors suitably configured to support operation of the aircraft 100. In some embodiments, the position-determining system 120 may also obtain and/or determine the heading of the aircraft 100 (i.e., the direction that aircraft 100 is traveling relative to some reference) using a magnet compass or a magnetometer, for example. The position-determining system 120 may also include a barometric altimeter such that the position of the aircraft 100 may be additionally determined with reference to a barometric altitude. In some embodiments, the GPS may alternatively or additionally provide altitude information as part of the position-determining system 120. As such, in an exemplary embodiment, the position-determining system 120 is capable of obtaining and/or determining the instantaneous position and altitude of the aircraft 100, that is, the current location of the aircraft 100 (e.g., the latitude and longitude) and the altitude and heading of the aircraft 100. The position-determining system 120 may provide this information to the processing system 105 and the flight management system 110 to support their operation, as described above.

The flight-deck display system 140 may be embodied as an electronic display configured to graphically display weather information, flight information, traffic information, or other data associated with operation of the aircraft 100. In this regard, display system 140 is operably coupled to the processing system 105, and may receive and graphically display information from the flight management system 110

(such as the flight plan), position-determining system 120 (such as the position, altitude, and heading of aircraft 100), and the weather radar system 160 (such as reflectivity data and convective cell growth symbology). The flight-deck display system 140 may be located within a flight-deck/cockpit of the aircraft 100. Flight-deck display system 140 may be embodied as one or more physical display devices of any type, and it may include a user interface that is adapted to allow a user (e.g., flight crew member) to interact with the display system 140 and more generally the FMS 110. Non-limiting examples of such display devices include various cathode ray tube (CRT) displays, and various flat panel displays such as various types of LCD (liquid crystal display) and TFT (thin film transistor) displays, panel mounted displays, and head-up display (HUD) projections. Non-limiting examples of such user interfaces include various keypads, touchpads, keyboards, mouses, touchscreens, joysticks, microphones, or other suitable devices adapted to receive input from a user. Flight-deck display system can also include other devices that are not physically integrated into the aircraft 100, such as an electronic flight bag (EFB) and the like.

Weather radar system 160 is operably coupled with processing system 105, data buffer system 115, and flight-deck display system 140 to provide weather radar data to the flight crew of aircraft 100. In general, the weather radar system 160 may be any suitable radar system that is operable to detect weather that is located within a detectable range from the aircraft 100, such as 100 miles or more. The weather radar system 160 is configured to sense sufficient weather radar return information in order to determine a volume of water in a given three-dimensional region of airspace. Weather radar system 160 may include an antenna that is operable to emit radar pulses and to receive radar returns, herein referred to as reflectivity data. Reflectivity data corresponds to that portion of a radar's signal reflected back to the radar by liquids (e.g., rain) and/or frozen droplets (e.g., hail, sleet, and/or snow) residing in a weather object, such as a convective weather cell, or residing in areas proximate to a cloud or storm generating the liquids and/or frozen droplets. The weather radar system 160 is configured to calculate the distance of the weather object relative to the antenna based upon the length of time the transmitted signal pulse takes in the transition from the antenna to the object and back to the antenna. The relationship between distance and time is linear as the velocity of the signal is constant, approximately the speed of light in a vacuum. The antenna may be operable to sweep in a back-and-forth motion, as well as in an up-and-down motion (tilt), such that the weather radar system 160 is able to scan an airspace region of interest in proximity to the aircraft. Such radar reflectivity data may be provided to data buffer system 115 for use in accordance with the presently-described embodiments, as well as processing system 105 for display on the flight-deck display system 140 along with appropriate overlaid symbology, as applicable.

As noted initially, embodiments of the present disclosure employ the weather radar system 160 to obtain the three-dimensional distribution of radar reflectivity of weather for storage in the data buffer system 115. The embodiments may perform sums or other integrations of the stored reflectivity data in vertical columns of the data buffer system 115, and they may evaluate the integrations to obtain VIR values. In this regard, an integration of reflectivity values stored in a column of data addresses in the three-dimensional data buffer system 115 is calculated.

Figure 2:
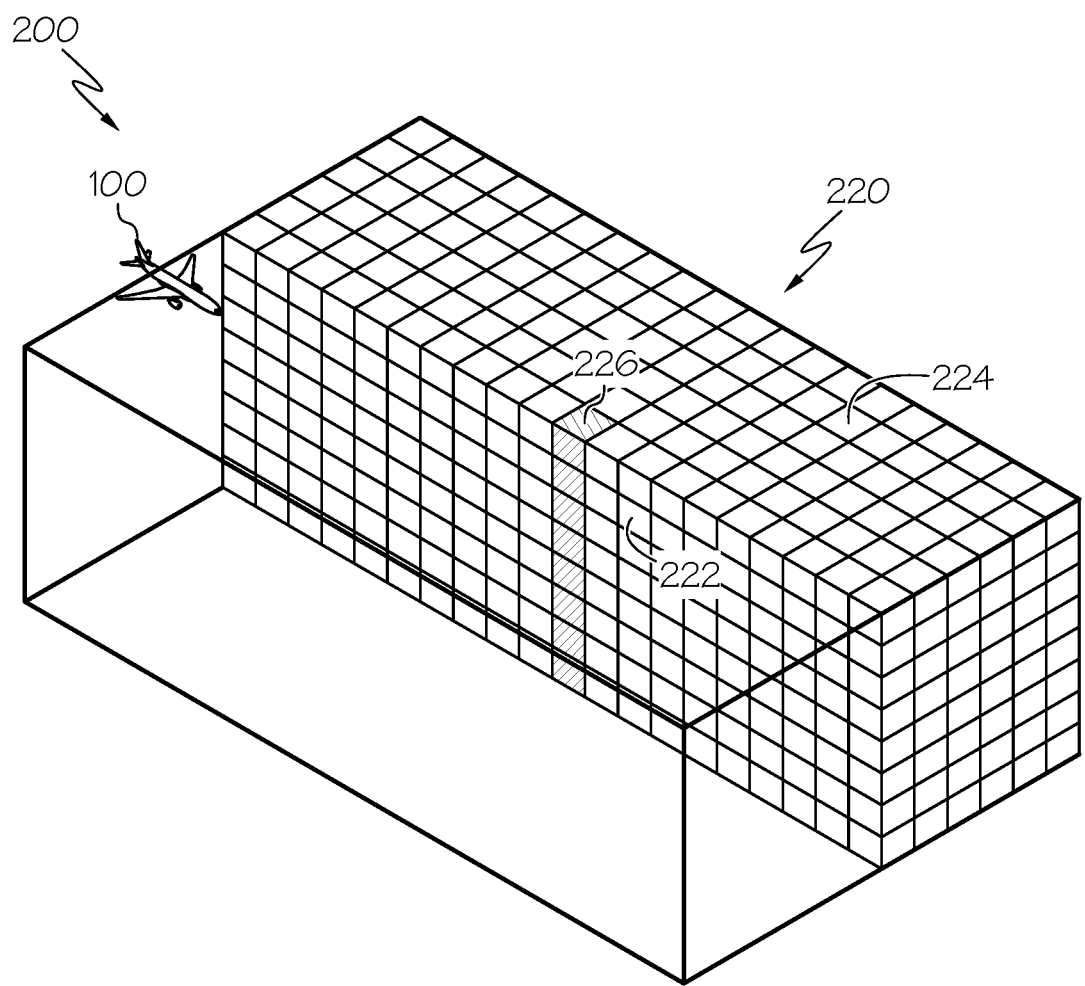
FIG. 2 is a conceptual perspective view of a portion of a three-dimensional data buffer containing weather radar reflectivity data in accordance with exemplary embodiments of the present disclosure.

FIG. 2 is a conceptual perspective view of a portion of a three-dimensional data buffer 220 containing weather radar reflectivity data in accordance with exemplary embodiments of the present disclosure. Each data address or "cell" is representative of a three-dimensional, physical location in an environment 200 through which the aircraft 100 is flying. As shown, the data buffer 220 includes a plurality of such cells, e.g. cells 222 and 224. A vertical column of cells 226 is representative of a particular geographic location/area at all altitudes for which reflectivity data is available. Two or more adjacent vertical columns of reflectivity data may represent a convective weather cell.

For any given column 226 as shown in FIG. 2, in one embodiment, the calculation to obtain a VIR value may be performed in the following manner:

$$\sum_{i=1}^{N} Z_i^a h_i^b \Delta h$$

where $Z_i$ is the reflectivity of the i-th cell in the column, $h_i$ is the altitude of the i-th cell in the column, N is the number of cells in the column 226 in the volumetric data buffer 220, and $\Delta h$ is the vertical size of the buffer cell (222, 224). When power values a=1 and b=0, then a straight (non-augmented) vertical integration of reflectivity (i.e., VIR) is performed. Variations of this embodiment may be augmented by employing other values of a to account for non-standard reflectivities obtained by the weather radar system 160, and other values of b may be used when reflectivity as a function of altitude (height) is desired. For example, another particular embodiment may utilize a=1 and b=1.

The data buffer system 115 is updated with new data over time, such data being compensated for movement of the aircraft, movement of the convective cell, and the curvature of the Earth. The amount of time between successive scans may generally depend on the time that it takes the system 160 to complete a scan, which varies from system to system. The compensation for aircraft movement (as well as Earth curvature, which is a known value) can be accomplished in coordination with the flight management system 110 and position-determining system 120 receiving indications of aircraft parameters such as speed, altitude, and geographic location during the course of the operation of the aircraft. Furthermore, movement of the convective cell may be accomplished in accordance with the algorithms described in commonly-assigned U.S. Pat. No. 8,319,679, the contents of which are herein incorporated by reference in their entirety. The '679 patent generally describes a tracking function that provides a filtered convective cell position and velocity in the earth-fixed horizontal plane. The tracking function involves taking noisy measurements of cell position taken over time and estimating actual cell position and velocity. Thus, each successive store of new data over time is representative of the VIR values for a convective cell at successive points in time.

Referring now to FIG. 3, illustrated is a flowchart of a method 300 for determining convective cell growth from weather radar reflectivity data in accordance with exemplary embodiments of the present disclosure. At step 302, at a first point in time, the weather radar system 160 in communication with the processing system 105 operates to obtain first reflectivity values for a volume of space in front of the aircraft. These first reflectivity values are then saved to the data buffer system 115 in its data buffer 220, wherein reflectivity values are saved in cells (222, 224) representative of the location from which particular reflectivity returns were received. Then, at step 304, at a second point in time that is subsequent to the first point in time, the weather radar system 160 in communication with the processing system 105 operates to obtain second reflectivity values for a volume of space in front of the aircraft. These second reflectivity values are then saved to the data buffer system 115 in its data buffer 220 in the same manner as the first reflectivity values. It should be noted that the second reflectivity values may be corrected for aircraft movement, convective cell movement, and the curvature of the Earth, as described above, such that the second reflectivity values are representative of the same convective cell as the first reflectivity values, and not necessarily the exact same points in space. Particularly regarding convective cell movement, it should also be noted that, as described above, two or more adjacent columns, due to their reflectivity values, may be determined to constitute a convective cell, and thus the steps of method 300 that are described with regard to columns may be understood as applicable to the two or more adjacent columns defining a convective cell.

At step 306 of method 300, the processing system 105 operating in conjunction with the data buffer system 115 calculates a sum of reflectivity values in each column of cells 226 in the three-dimensional data buffer 220. This calculation is performed for each column 226 and for both of the first and second stored reflectivity values. The result of these calculations is a VIR value for each column 226 for both of the first and second stored reflectivity values. Then, at step 308, for each column 226, the VIR value from the first reflectivity values may be compared against the VIR value for the same column 226 from the second reflectivity values, in order to determine a VIR difference. Where the VIR difference is an increase, there is thus an indication that the convective cell associated with the column(s) is growing in size, area, or intensity.

In some embodiments, at step 310 of method 300, it may be determined whether the VIR difference for a given column 226 exceeds a threshold value. For example, in some embodiments, while a small difference may be indicative of some small amount of growth, from a human factors perspective it may be more important to provide notifications to the flight crew of an aircraft of significant increases as compared to de minimis or other small increases. As such, the threshold value may be pre-programmed into the processing system 105 in advance, and the value may be determined based on flight crew preferences, operating location, and weather radar system 160 sensitivity/performance, among other considerations. At conditional step 312, if the VIR difference exceeds the threshold value, convective cell growth symbology may be displayed to the flight crew using display system 140 as an overlay on the reflectivity imagery. The form of the symbology is not particularly limited in this disclosure; one illustrative example thereof is a "+" symbol, in an embodiment. The overlay may be located on the display at the location(s) of the reflectivity imagery where the convective cell growth is occurring. Exemplary displays with reflectivity imagery and convective cell growth symbology are provided and described below in connection with FIGS. 4-6. Alternatively, at conditional step 314, if the VIR difference does not exceed the threshold value, then the convective cell growth symbology is not displayed (whereas the reflectivity imagery and possibly other symbology, such as lightning or hail hazards, may still be displayed).

As previously noted, the convective cell growth symbology displayed on the display system 140 as an overlay to the reflectivity imagery may be one of a plurality of symbology that includes others, such as lightning or hail. (See, e.g., commonly-assigned U.S. Pat. No. 8,068,050, the contents of which are incorporated herein by reference in their entirety; describing the generation and display of lightning and hail symbology.) As such, the convective cell growth symbology described herein may fall within a symbology hierarchy that includes the other symbology. As a convective cell may simultaneously be growing, have lightning, and be generating hail, the display of system 140 provided to the flight crew may become "cluttered" if all symbology were displayed at the same location, thus detracting from the ease of interpretation of the display, and possibly impairing flight crew situational awareness. Thus, the hierarchy described herein determines which symbology takes precedence of display when more than one symbology is applicable.

In one exemplary embodiment, the hierarchy may be as follows, from lowest precedence to highest precedence: base reflectivity data; convective cell coloring in the reflectivity imagery; convective cell growth symbology overlay; lightning symbology overlay or hail symbology overlay. In this embodiment, where reflectivity returns are received, but the values thereof are low enough such that convective weather is unlikely, only the base reflectivity returns are displayed using display system 140 (usually in various shades of green, yellow, and orange to indicated intensity). In the next level of the hierarchy, wherein the reflectivity is strong enough in particular locations so as to be indicative of a convective cell, the coloring at the location of the suspected convective cell is changed to indicate the hazard (such as using magenta or red coloring, for contrast with the surrounding precipitation). In the next highest level, where cell growth is indicated beyond a threshold value in accordance with the present disclosure, the cell growth symbology (e.g., "+") may be overlaid on the convective cell imagery where the growth is occurring. Thereafter in the hierarchy, if either of lightning or hail hazards are determined to be present as described above, and assuming cell growth is concurrently indicated, instead of displaying the cell growth symbology, one of the hazard symbology is displayed (order of precedence may be either hail or lightning, in various embodiments, where both are indicated).

ILLUSTRATIVE EXAMPLES

The present disclosure is now illustrated by the following non-limiting examples of flight-deck displays providing weather reflectivity imagery and convective cell growth symbology. It should be noted that various changes and modifications can be applied to the following examples without departing from the scope of this disclosure, which is defined in the appended claims. Therefore, it should be noted that the following examples should be interpreted as illustrative only and not limiting in any sense.

FIG. 4 illustrates an exemplary long-range weather radar display 401 (as may be provided on display system 140) that includes a convective cell indicating cell growth above a predetermined threshold value 411. Given that the range of the scan is indicated at 320 miles (top left corner), the location of the convective cell is about 200 miles in front of the aircraft at a bearing of about 30 degrees east of the direction of travel of the aircraft. The convective cell growth symbology is shown as a "+" symbol. FIG. 5 illustrates another exemplary long-range weather radar display 402 that includes at least one convective cell indicating cell growth 411 (about 170 miles directly in front of the aircraft), but further includes other convective cells that indicate hazards that take precedence in the hierarchy of symbology. For example, FIG. 5 further includes a convective cell with indicated hail 412 (about 210 miles ahead of the aircraft at a bearing of about 10 degrees west of the direction of travel) and a convective cell with indicated lightning 413 (about 150 miles away from the aircraft at a bearing generally northeast of the direction of travel). In yet another example, FIG. 6 provides a short-range (20 miles) weather radar display 403 that shows several convective cells indicating cell growth 411 immediately west and northwest of the aircraft, but also illustrates the difference in coloring to show convective weather (red/magenta in the inner portions of the cells, surrounded by non-convective outer rings of yellow/green; note that colors are simulated using various shading patterns in the Figures). As can be seen, even within the broader convective weather indication, the particular location(s) of cell growth above the threshold value can be specifically indicated with the symbology for greater situational awareness than would otherwise be possible with differences in coloring alone.

Accordingly, the present disclosure has provided several embodiments of systems and methods for determining convective cell growth from weather radar reflectivity data. The disclosed systems and methods beneficially provide symbology-based enhanced situational awareness to the flight crew regarding weather hazards that would otherwise require significant cognitive effort to determine and track over time as the aircraft approaches a convective weather system. As such, the described embodiments are expected to positively impact aircraft operational safety and passenger comfort.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for determining convective cell growth from weather radar reflectivity data comprising:
 a display device couple to receive display commands and configured, in response to the display commands, to display one or more images; and
 a processing device coupled to the display device and configured to:
  a) receive first weather reflectivity values and receiving second weather reflectivity values at a point in time subsequent to receiving the first weather reflectivity values;
  b) store the first and second weather reflectivity values in cells of a three- dimensional buffer;
  c) for each of the first and second weather reflectivity values, calculate a vertically-integrated reflectivity (VIR) value for a column of cells in the three-dimensional buffer, the column of cells being associated with a latitude/longitude position;
  d) compare the VIR value for the second weather reflectivity values against the VIR for the first weather reflectivity values to determine a difference in the VIR values; and
  e) when the difference in the VIR values is greater than a threshold value, supply display commands to the display device that cause the display device to display a convective cell growth hazard indication on the display device in an area of the display device that corresponds to the latitude/longitude position.

2. The system of claim 1, further comprising a weather radar system, wherein the first and second weather reflectivity values are generated by the weather radar system.

3. The system of claim 2, wherein the point in time subsequent is indicative of a scanning rate of the weather radar system.

4. The system of claim 2, wherein the three-dimensional buffer is representative of a volume of airspace in front of the weather radar system.

5. The system of claim 2, wherein the column of cells comprises reflectivity values for all altitudes scanned by the weather radar system at the latitude/longitude position.

6. The system of claim 2, wherein the display device comprises a cockpit weather radar display of an aircraft.

7. The system of claim 6, wherein the display device is further configured, in response to display commands from the processing device, to display reflectivity imagery along with the convective cell growth hazard indication, wherein the convective cell growth hazard indication is overlaid on the reflectivity imagery.

8. The system of claim 6, wherein the display device is further configured, in response to display commands from the processing device, to display hail or lightning hazard indications overlaid on the reflectivity imagery.

9. The system of claim 8, wherein the convective cell growth hazard indication and the hail or lightning hazard indications comprise a display hierarchy wherein only one indication is displayed at a location based on the hierarchy.

10. An aircraft comprising the system of claim 1.

* * * * *